Figure 1:
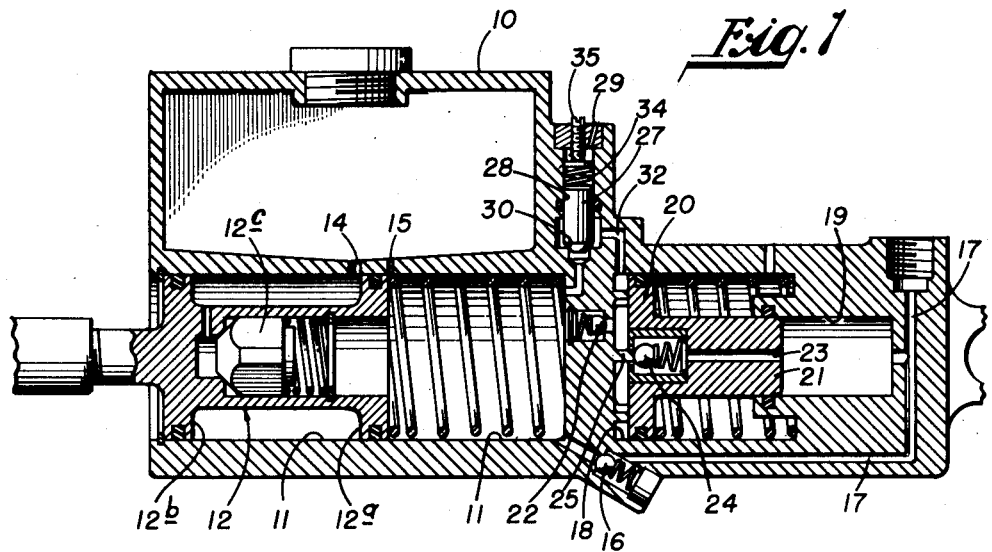

June 23, 1953　　　C. E. DEARDORFF　　　2,642,720
COMPOUND MASTER CYLINDER UNIT FOR HYDRAULIC SYSTEMS
Filed Feb. 21, 1950

INVENTOR
C. E. DEARDORFF
BY
ATTORNEY

Patented June 23, 1953

2,642,720

UNITED STATES PATENT OFFICE 2,642,720

COMPOUND MASTER CYLINDER UNIT FOR HYDRAULIC SYSTEMS

Clinton E. Deardorff, San Fernando, Calif., assignor to Bendix Aviation Corporation, South Bend, Ind., a corporation of Delaware Application February 21, 1950, Serial No. 145,455

2 Claims. (Cl. 60—54.6)

This invention relates to hydraulic systems in which manual or pedal actuation of a pump (master cylinder) unit delivers pressure fluid through a line to one or more remote motor cylinders for producing motion at the remote point. A hydraulic brake system is a typical example, and the invention will be described with reference thereto, although it has application to other hydraulic systems as well.

An object of the invention is to increase the volumetric capacity of a master cylinder unit without reducing the maximum pressure it is capable of producing.

Another object is to provide a master cylinder unit capable, in response to a given actuating force, of delivering a rapid flow of fluid at a low pressure, and a slower flow at a higher pressure.

Another object is to provide a master cylinder unit possessing the foregoing characteristics, that is simple and practicable.

Other more specific objects and features of the invention will appear from the description to follow of a specific embodiment.

In a conventional hydraulic brake system, the entire volume of fluid that is transmitted to the brake cylinders is delivered by the master cylinder. The force that can be applied to move the piston of the master cylinder is limited by the strength of the operator, and for a given force, the maximum pressure that can be produced is determined by the diameter of the cylinder. By making the diameter sufficiently small, a pressure of any desired magnitude can be obtained. However, reducing the diameter of the cylinder reduces the volume of fluid that can be discharged. In actual practice, the diameter of the cylinder is a compromise between the maximum diameter that will produce the desired pressure, and the minimum diameter that will deliver the quantity of fluid required. The volume of fluid that must be delivered by the master cylinder is determined by the adjustment of the brakes. If the brakes are adjusted as tightly as possible without dragging, the minimum amount of fluid is required. On the other hand, as the brakes wear, and the clearance between the shoes and the drums increases, a larger volume of fluid is required to move the shoes out into engagement with the drum. When the master cylinder capacity is small, frequent brake adjustments are necessary. On the other hand, if the master cylinder capacity can be made large, relatively infrequent brake adjustments will be required.

The present invention provides a master cylinder that is capable of providing a large volume of fluid at low pressure, and is then capable of providing a relatively small quantity of fluid at a much higher pressure. The large volume at low pressure suffices to fill the brake cylinders and move the brake shoes out against the drums, whereupon the higher pressure is developed to increase the force that the shoes exert against the drums. This result is obtained by providing, in the master cylinder unit, a large main pump cylinder which is capable of delivering a large volume of fluid at low pressure. This can be delivered through a check valve to the hydraulic line to fill the brakes. The higher pressure to tighten the shoes against the drums is developed by a booster cylinder of much smaller diameter than the main pump cylinder and which is actuated by a booster motor cylinder of large diameter. This booster motor cylinder is cut in automatically by a pressure responsive valve when the pressure in the main pump cylinder rises to a predetermined value. During the booster operation, fluid flow from the brake line back to the main pump cylinder is prevented by a check valve. When the main pump piston is released to release the brake, the fluid returning from the brakes first returns the booster motor and pump pistons to their retracted positions, the fluid being exhausted from the booster motor back into the main pump cylinder either through the pressure responsive valve or through a check valve provided for that purpose. When the booster pistons are fully retracted, a valve in the booster piston is opened to permit the remainder of the fluid in the lines to flow back through the check valve into the main pump cylinder.

Figure 2:
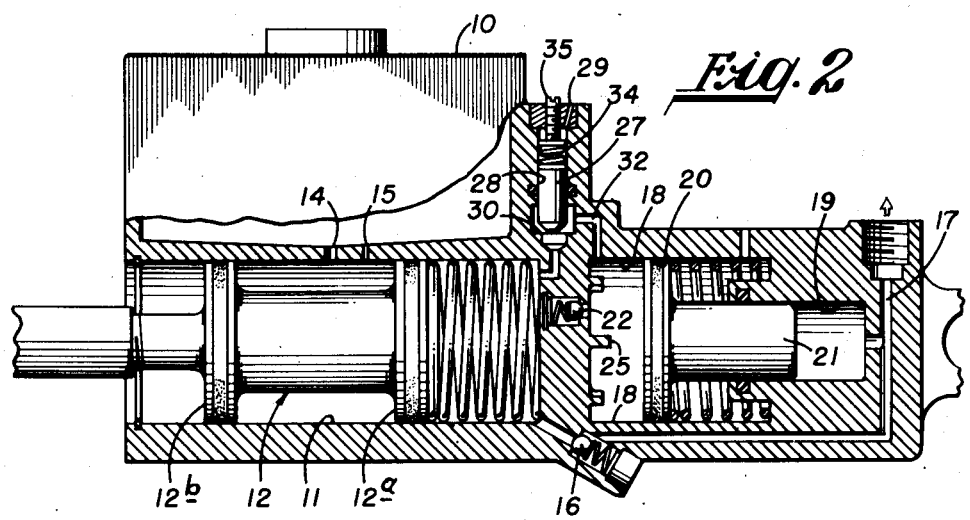

Referring now to the drawing:

Fig. 1 is a longitudinal sectional view through a compound master cylinder unit in accordance with the invention; and Fig. 2 is a sectional view similar to Fig. 1, but showing the parts in a different position of operation.

The compound master cylinder unit disclosed in the drawing comprises the usual reservoir 10, main pump cylinder 11, and main pump piston 12. Thus the piston 12 comprises the usual primary piston portion 12a and secondary piston portion 12b, and contains a check valve 12c for permitting flow of fluid from the reservoir 10 into the main pump cylinder during rapid retraction of the piston 12. The usual passages 14 and 15 are provided between reservoir 10 and the cylinder 11.

The main pump cylinder 11 is communicated by a pump discharge check valve 16 with a discharge passage 17 that is adapted to be connected to the load (the usual brake line in a hydraulic brake system).

There is formed, integrally with the main pump cylinder 11, a booster motor cylinder 18 and a booster pump cylinder 19, cylinder 18 containing a booster motor piston 20, and cylinder 19 containing a booster pump piston 21, which are formed as a single unit. The main pump cylinder 11 is communicated with the booster motor cylinder 18 by a return-flow check valve 22 which permits flow from the cylinder 18 into the cylinder 11 but prevents flow in the opposite direction. The booster pump cylinder 19 is communicated with the booster motor cylinder 18 by a passage 23 extending through the pistons 21 and 20 and containing an auxiliary return-flow valve 24 which is held open by a projection 25 in the left end of the motor cylinder 18 when the piston 20 is in leftmost position.

A booster control valve 27 communicates the main pump cylinder 11 with the booster motor cylinder 18 when the pressure is above a predetermined minimum. This valve 27 is in the form of a piston sealing in a small cylinder 28 which is vented to atmosphere by a vent 29 at its outer end and terminates at its inner end in a seat 30 which is in constant communication with the main pump cylinder 11. The cylinder 28 is communicated intermediate its ends by a passage 32 with the booster motor cylinder 18. The valve 27 is urged against the seat 30 by a helical compression spring 34, the loading of which can be adjusted with a screw 35.

Fig. 1 shows the unit in inactive position, in which the main pump piston 12 is fully retracted to communicate the reservoir 10 with the main pump cylinder 11 through the vent 15, the valve 27 is closed, and the booster pistons 20 and 21 are in fully retracted position. Now let it be assumed that the main pump piston 12 is advanced to the right in response to movement of a brake pedal or other manually operable device. The piston displaces liquid from the main pump cylinder 11 past the check valve 16 into the discharge passage 17 and thence to the brakes (in a braking system) to fill the brake cylinders. During the filling period there will be relatively little reaction to the free flow of fluid from the discharge passage 17, and the pressure in the main pump cylinder 11 will not rise high enough to open the valve 27.

However, when the brakes are filled, the pressure will rise in the discharge passage 17 and in the cylinder 11 to a value sufficient to open the valve 27 against the resistance of the spring 34, thereby permitting fluid to flow through the passage 32 into the booster motor cylinder 18. With the booster piston in the position shown in Fig. 1, this fluid could flow on through the passage 23 past the open valve 24. However, prior to the opening of the valve 27, the pistons 20 and 21 move to the right a sufficient distance to carry the valve 24 clear of the projection 25 and permit the valve to seat. This initial movement is produced by virtue of the fact that the face of piston 20 has a much larger area than the face of piston 21, so that the same pressure applied to both faces will cause the piston to move to the right. Since the auxiliary pump cylinder 19 is permanently connected to the discharge passage 17, the pressure in the cylinder 19 and in the cylinder 18 rises with the pressure in the discharge line 17 prior to the opening of the valve 27.

For the reasons given, the pistons 20 and 21 have moved sufficiently to permit closure of the valve 24 prior to the time when the valve 27 opened. Therefore, after the opening of the valve 27, fluid flows from the main pump cylinder 11 into the booster motor cylinder 18 and moves the booster motor piston 20 and the booster pump piston 21 to the right, forcing the fluid trapped in the cylinder 19 into the discharge passage 17. By virtue of the fact that the face of piston 21 is much smaller than the face of the main pump piston 12, a substantially higher pressure can be produced in the discharge passage 17 after the valve 27 opens than it was possible to produce with the main cylinder 11 and main piston 12 alone.

When the maximum force has been applied to the main pump piston 12, the mechanism may be in the condition shown in Fig. 2. It will be noted that the valve 27 remains open as long as the pressure in the main pump cylinder 11 remains above a predetermined value.

When the force is removed from the main pump piston 12 the pressure in the main pump cylinder drops, and fluid flows back into the unit from the brakes through the discharge passage 17. Such return flow of fluid is initially into the cylinder 19, since both the valve 16 and 24 are closed. This returns the pistons 21 and 20 and displaces fluid from the motor cylinder 18 back into the pump cylinder 11 either through the passage 32 and past the valve 27 (as long as the latter remains open) or past the check valve 22. When the piston 20 returns to its normal position, the projection 25 opens the valve 24, and, thereafter, fluid returning from the brakes through the passage 17 flows through the cylinder 19, the passage 23, past the open valve 24 into the cylinder 18, and thence past the check valve 22 into the main pump cylinder 11. This restores the apparatus to the normal position as shown in Fig. 1 and completes a cycle of operation.

Because of the large diameter of the main pump cylinder 11, only a fraction of the full stroke of the main pump piston 12 suffices to fill the brake cylinders and move the shoes into contact with the drum even when the brakes are in relatively loose adjustment. The additional movement of the main piston, after the brakes have contacted the drums and the valve 27 has opened, is independent of the brake adjustment and is relatively small, since brake shoes move very little in response to further increase in pressure after they are against the drums.

A conventional master cylinder capable of developing the same pressure would have to employ a pump piston of the same, small diameter as the booster piston 21, and obviously it would have to have a much longer stroke than the large piston 12 to have the same filling capacity.

Although for the purpose of explaining the invention, a particular embodiment thereof has been shown and described, obvious modifications will occur to a person skilled in the art, and I do not desire to be limited to the exact details shown and described.

I claim:

1. Apparatus for supplying pressure fluid to a hydraulic system comprising: a main pump cylinder containing a main pump piston normally retracted and adapted to be advanced by external force to discharge fluid from said main pump cylinder; a discharge passage adapted to be connected to a load line, and a pump discharge check valve connecting said main pump cylinder to said discharge passage for flow from said cylinder to said passage; a booster motor cylinder connected to said main pump cylinder by a return-flow check valve for permitting flow from said booster motor cylinder to said main pump cylinder; a normally retracted booster motor piston in said booster motor cylinder adapted to be advanced by fluid flow into said booster motor cylinder; a booster pump cylinder of smaller bore than said booster motor cylinder and connected to said discharge passage; a normally retracted booster pump piston in said booster pump cylinder and means for advancing it to expel fluid from said booster pump cylinder into said discharge passage in response to advance of said booster motor piston; a pressure responsive booster pump control valve communicating said main pump cylinder with said booster motor cylinder in response to pressures in said main pump cylinder above a predetermined value; a passage intercommunicating said booster motor and booster pump cylinders, and an auxiliary return flow valve in said last mentioned passage for blocking flow from said booster pump cylinder to said booster motor cylinder except when said booster pistons are in their retracted positions; said auxiliary return flow valve consisting of a check valve directed to permit flow from said booster motor cylinder to said booster pump cylinder in all positions of said booster pistons, and stop means for engaging said check valve and opening it for fluid flow therethrough in both directions in response to movement of said booster pistons into retracted position.

2. Apparatus for supplying pressure fluid to a hydraulic system comprising: a main pump cylinder containing a main pump piston normally retracted and adapted to be advanced by external force to discharge fluid from said main pump cylinder; a discharge passage adapted to be connected to a load line, and a pump discharge check valve connecting said main pump cylinder to said discharge passage for flow from said cylinder to said passage; a booster motor cylinder connected to said main pump cylinder by a return flow check valve for permitting flow from said booster motor cylinder to said main pump cylinder; a normally retracted booster motor piston in said booster motor cylinder adapted to be advanced by fluid flow into said booster motor cylinder; a booster pump cylinder of smaller bore than said booster motor cylinder and connected to said discharge passage; a normally retracted booster pump piston in said booster pump cylinder and means for advancing it to expel fluid from said booster pump cylinder into said discharge passage in response to advance of said booster motor piston; a pressure responsive booster pump control valve communicating said main pump cylinder with said booster motor cylinder in response to pressures in said main pump cylinder exceeding atmospheric pressure by a predetermined fixed value, said booster control valve means comprising a piston element having one face exposed to the pressure fluid in said main pump cylinder and an opposite face exposed to atmospheric pressure, and spring means acting on said piston element in opposition to pressure forces on said one face; passage means including a normally closed auxiliary return flow valve communicating said booster pump cylinder and said discharge passage with said booster motor cylinder; and means responsive to the position of said booster pistons for opening said auxiliary valve when said booster pistons are in their retracted positions.

CLINTON E. DEARDORFF.

References Cited in the file of this patent

UNITED STATES PATENTS

| Number | Name | Date |
|---|---|---|
| 1,620,115 | MacKenzie | Mar. 8, 1927 |
| 2,191,716 | Hunt | Feb. 27, 1940 |
| 2,263,263 | Dodge | Nov. 18, 1941 |
| 2,452,292 | Cousino | Oct. 26, 1948 |